United States Patent [19]

Bram

[11] Patent Number: 4,890,218
[45] Date of Patent: Dec. 26, 1989

[54] VARIABLE LENGTH INSTRUCTION DECODING APPARATUS HAVING CROSS COUPLED FIRST AND SECOND MICROENGINES

[75] Inventor: Jeffry M. Bram, Natick, Mass.

[73] Assignee: Raytheon Company, Lexington, Mass.

[21] Appl. No.: 231,646

[22] Filed: Aug. 10, 1988

Related U.S. Application Data

[63] Continuation of Ser. No. 881,301, Jul. 2, 1986, abandoned.

[51] Int. Cl.[4] .............................................. G06F 9/28
[52] U.S. Cl. .............................. 364/200; 364/231.8; 364/244.6; 364/262.8; 364/263.1
[58] Field of Search ... 364/200 MS File, 900 MS File

[56] References Cited

U.S. PATENT DOCUMENTS

| | | | |
|---|---|---|---|
| 4,136,383 | 1/1979 | Takesue | 364/200 |
| 4,168,523 | 9/1979 | Chari et al. | 364/200 |
| 4,415,969 | 11/1983 | Bayliss et al. | 364/200 |
| 4,454,578 | 6/1984 | Matsumoto et al. | 364/200 |
| 4,459,666 | 7/1984 | Kruger | 364/200 |
| 4,519,033 | 5/1985 | Vaughn et al. | 364/200 |
| 4,546,431 | 10/1985 | Horvath | 364/200 |
| 4,574,344 | 3/1986 | Harris et al. | 364/200 |
| 4,587,611 | 5/1986 | Amdahl et al. | 364/200 |
| 4,594,658 | 6/1986 | Steckler | 364/200 |
| 4,620,275 | 10/1986 | Wallach et al. | 364/200 |
| 4,638,429 | 1/1987 | Watabe et al. | 364/200 |
| 4,685,058 | 8/1987 | Lee et al. | 364/200 |
| 4,685,080 | 8/1987 | Rhodes, Jr. et al. | 364/900 |

*Primary Examiner*—Thomas C. Lee
*Attorney, Agent, or Firm*—Walter F. Dawson; Richard M. Sharkansky

[57] ABSTRACT

A pipeline computer architecture having two interconnected microengines operating simultaneously in an instruction preparation unit of a pipeline computer system. Each microengine operates on the same portion or different portions of an instruction concurrently within the same clock cycle. To assure coordination, one microengine is declared the executive or attribute generator and the other the main microengine. The main microengine generates routines to control the instruction preparation unit hardware. The executive microengine prepares the next tank in parallel and supplies arguments to the main microengine as the main microengine generates its current routine. At the completion of a routine performed by the main microengine, it signals the executive microengine to obtain the next task and associated parameters.

24 Claims, 4 Drawing Sheets

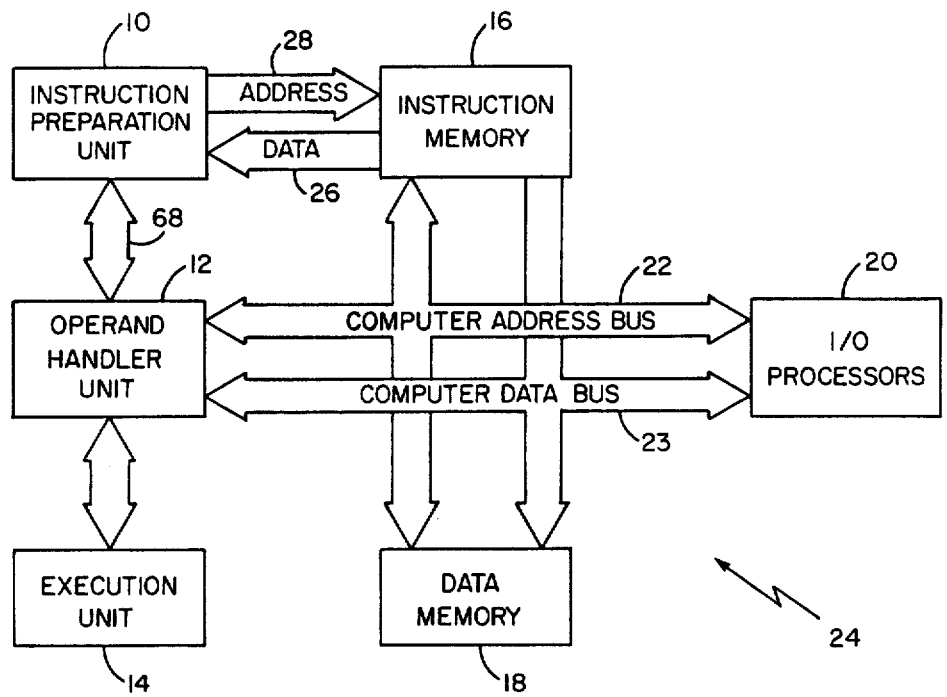
FIG. 2
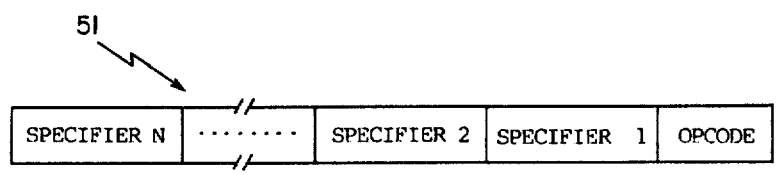
FIG. 3A
| SPECIFIER 2 DISPLACEMENT (4 BYTES) | OPERAND SPECIFIER 2 LONGWORD DISPLACEMENT MODE USING REGISTER 2 (1 BYTE) | OPERAND SPECIFIER 1 REGISTER MODE USING REGISTER 3 (1 BYTE) | OPCODE ADDL2 (1 BYTE) |
|---|---|---|---|
FIG. 3B

| SPECIFIER DISPLACEMENT (1, 2 or 4 BYTES) (IF NECESSARY) | READ LONGWORD SOURCE OPERAND SPECIFIER (1 or 2 BYTES) | OPCODE PSHLG (1 BYTE) |

VARIABLE LENGTH INSTRUCTION DECODING APPARATUS HAVING CROSS COUPLED FIRST AND SECOND MICROENGINES

The Government has rights in this invention pursuant to Contract No. DASG60-84-C-0001 awarded by Department of the Army.

This application is a continuation of application Ser. No. 881,301 field 7/2/86, now abandoned.

BACKGROUND OF THE INVENTION

This invention relates to general purpose computer systems and in particular to an apparatus and method for speeding-up instruction decoding of a variable length instruction in a pipelined computer system.

The processing of information in a computer at high rates has been accomplished in a number of ways. High speed circuits such as emitter coupled logic (ECL) have been used to obtain high clock rates for particular applications. Parallel processors have been used to perform high speed processing tasks. In a quasi-parallel system multiple microengines operate on information sequentially in a pipeline architecture. Any one microengine performs a portion of the task and passes the partial result on to the next microengine which continues processing the task. This approach increases the overall throughput of the processor, but it does not reduce the total processing delay from start to finish of the task nor does it minimize the processing time within a sequential microengine.

Processing a variable length instruction having an opcode and one or more specifiers with one microengine requires collapsing the multiple byte instruction into a unique starting address for each opcode-specifier combination resulting in two problems. One problem is that the number of different combinations of opcodes and specifiers would give rise to an enormous number of entry points to the microcode in a control store and an even greater number of actual lines of microcode. A second more important problem is that the existing integrated circuits do not have the fan-in capacity to span a sufficient number of bits to feasibly produce a starting point address.

SUMMARY OF THE INVENTION

In accordance with the present invention an instruction preparation unit of a pipeline computer system is provided for converting a variable length instruction into a local computer instruction. The instruction preparation unit has a register means for storing the variable length instruction and two interconnected microengines for decoding the variable length instruction. Each microengine operates on the same portion or different portions of a variable length instruction concurrently within the same clock cycle. The variable length instruction comprises only an opcode field for some instructions and for other instructions comprises the opcode field and a plurality of operand specifier fields. A first microengine means coupled to the register means decodes an opcode portion of the variable length instruction and each specifier field for the instructions having specifier fields. In addition, a second microengine means is coupled to the register means for decoding the opcode portion of the variable length instruction in order to provide a first portion of a local computer instruction. An input of the second microengine means is coupled to an output of the first microengine means and an output of the second microengine means is coupled to an input of the first microengine means. A calculator means performs the calculations to generate a second portion of the local computer instruction. The calculator means is coupled to a plurality of outputs of the first and second microengine means and to the operand specifier field in the variable length instruction. The first microengine primarily generates routines to implement the instruction and the second microengine primarily performs as an executive or attribute generator preparing for the next task and supplying arguments to the first microengine as the first microengine generates routines. Each microengine comprises a control store means and a register means.

In accordance with a further feature of the invention, a method is provided for converting a variable length instruction in a pipeline computer system into a local computer instruction comprising the steps of storing a variable length instruction in a register means of an instruction preparation unit, decoding a first portion of the variable length instruction and a second portion for a variable length instruction having the second portion with a first microengine means coupled to the register means, decoding the first portion of the variable length instruction with a second microengine means coupled to the register means, coupled to an output of the first microengine means and having an output coupled to an input of the first microengine means to generate a first portion of the local computer instruction, and performing calculations to generate a second portion of the local computer instruction with a calculator means having inputs coupled to a plurality of outputs of the first and second microengine means and to the second portion of the variable length instruction in the register means and having an output coupled to an input of the first microengine means. The step of decoding the first portion of the variable length instruction comprises decoding an opcode field and for the variable length instruction having the second portion comprises decoding at least one specifier field.

BRIEF DESCRIPTION OF THE DRAWINGS

Other and further features and advantages of the invention will become apparent in connection with the accompanying drawings wherein:

FIG. 2 is a block diagram of a pipelined computer system showing the instruction preparation unit of FIG. 1 interconnected within the system;

FIG. 3A shows a variable length instruction format having an opcode field and up to N operand specifier fields for decoding by the instruction preparation unit of FIG. 1;

FIG. 3B shows an instruction format for a two operand longword ADD instruction;

DESCRIPTION OF THE PREFERRED EMBODIMENTS

Figure 1:
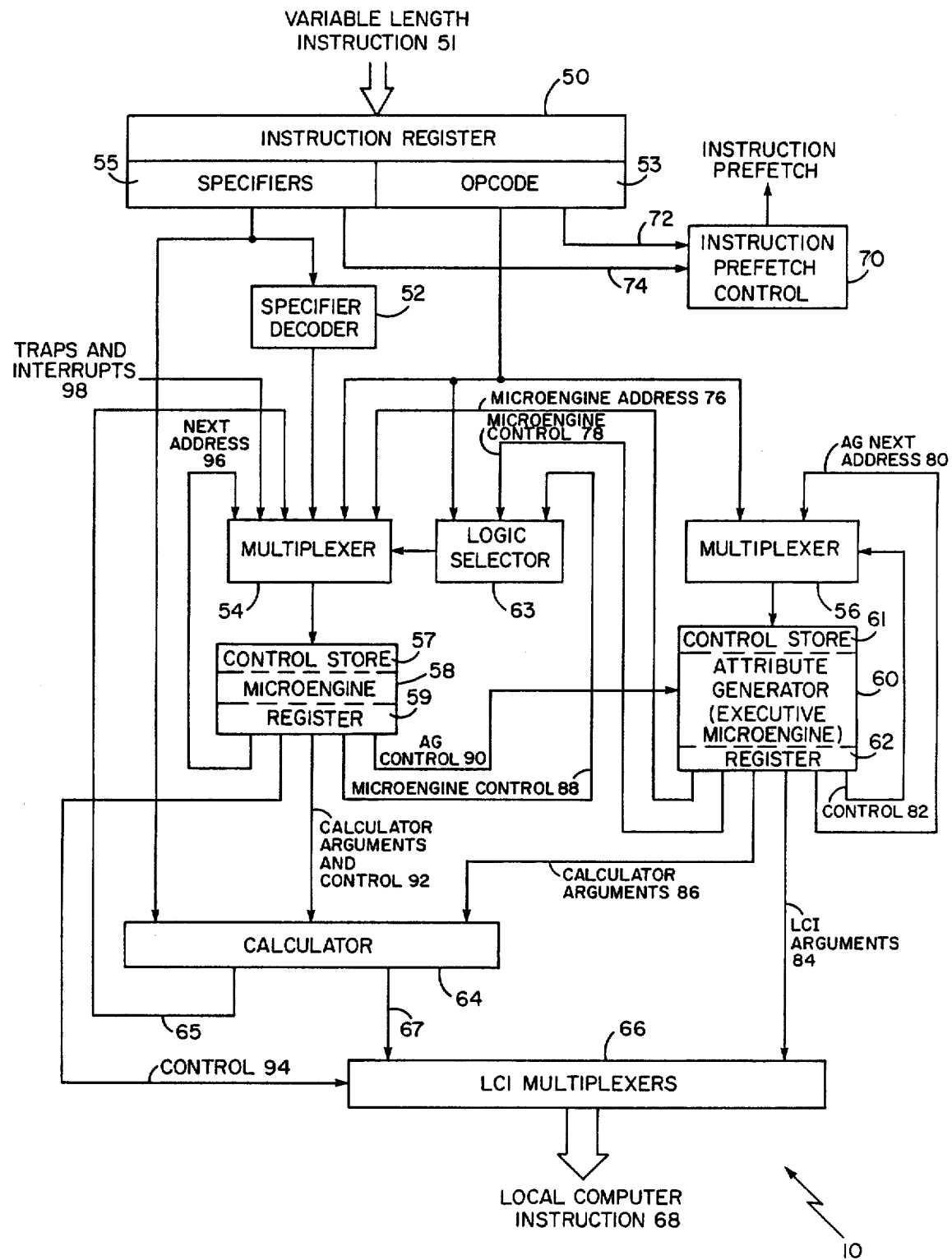
FIG. 1 is a block diagram of an instruction preparation unit embodying the invention.

Referring now to FIGS. 1 and 2, there is shown a block diagram of an instruction preparation unit 10 and a pipelined computer system 24 comprising the instruction preparation unit 10. The instruction preparation unit 10 comprises a microengine 58 and an executive microengine or attribute generator 60 which are interconnected and operating in parallel on a variable length instruction 51 input stored in instruction register 50 to convert the variable length instruction 51 into a local computer instruction 68. The microengines 58 and 60 are cross-coupled with the outputs of each one conditionally controlling and defining the inputs of the other one. A microengine 58, 60 provides the signals of the lowest control level for operating the computer system. The variable length instruction 51 as shown in FIG. 3A comprises an opcode field 53 and at least one specifier field 55 which are processed in parallel because each microengine 58 and 60 operates on different portions or fields of the instruction at the same time. However, some instructions in the computer system 24 may have only an opcode and no specifier in which case both microengines 58 and 60 operate on the opcode. Both microengines 58 and 60 must be tightly coupled or interconnected so that each continually knows where the other had started, what the other is doing and what output is expected from each microengine 58, 60. As a result, a decision must be made at the start of each instruction decoding as to what portion of the processing load is to be accomplished by each microengine 58, 60. Also, since the portions of an instruction are interdependent on each other (e.g. specifier evaluation lengths for an opcode), parameters must be requested and passed between microengines 58, 60 as they progress through their processing sequences. Finally the two microengines 58, 60 in concert produce the required local computer instruction (LCI) 68 output. An instruction stream is provided to the IPU 10 by an instruction prefetch control 70 which causes the next instruction memory field to be fetched so that while the current variable length instruction 51 is being processed, the next variable length instruction field is waiting to be loaded into the instruction register 50.

Figure 4:
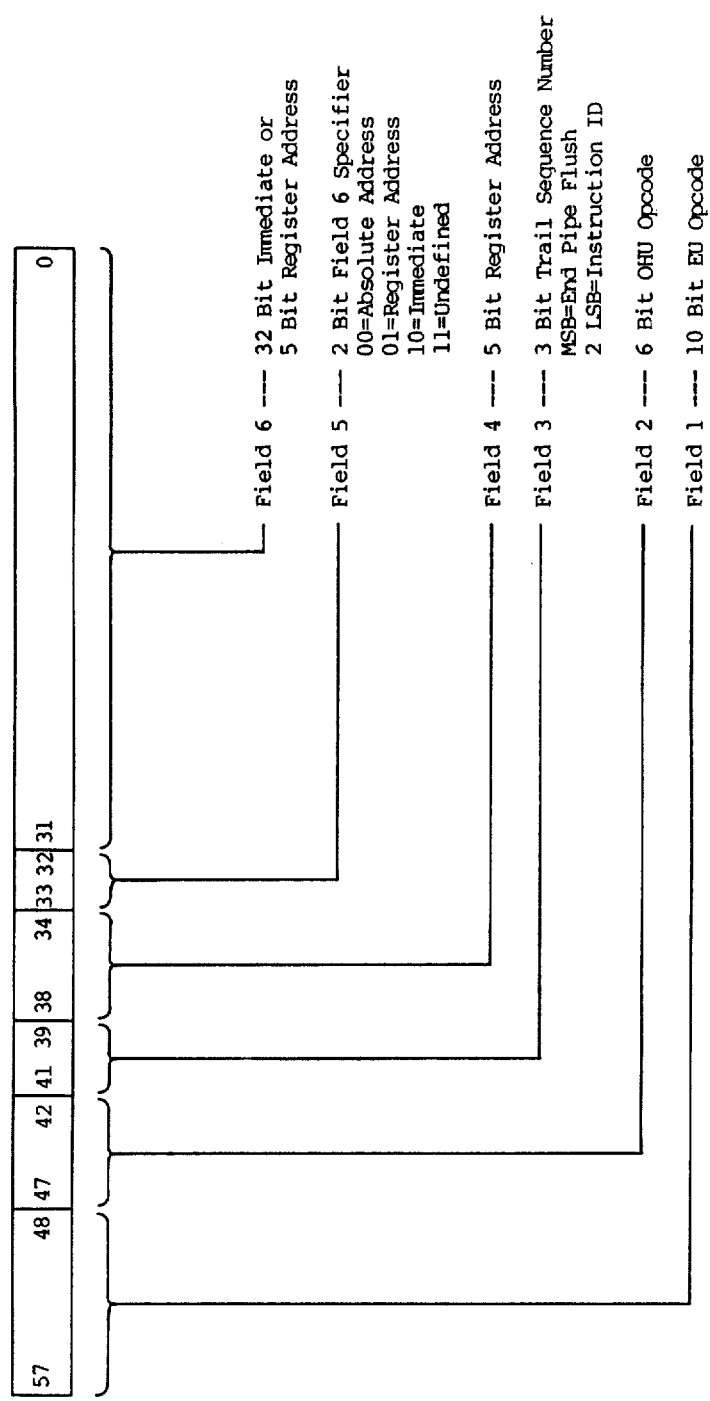
FIG. 4 shows the local computer instruction (LCI) output format produced by the instruction preparation unit.

Referring to FIG. 1 the input to microengine 58 is controlled by multiplexer 54 along with logic selector 63 which determines the source of the input to microengine 58. There may be eight sources of inputs to the multiplexer 54 each of which is selected by the 3-bit output to the multiplexer 54 from the logic selector 63. Such sources provide addresses to a control store 57 memory (8K words by 109 bits) in the microengine 58 and the control store 57 output is stored in a register 59. The addresses are provided by control sources such as a next microengine address 76 from attribute generator 60, a next address 96 from microengine 58, an opcode from the instruction register 50 and a decoded specifier from specifier decoder 52. Another input source is provided by the calculator 64 on line 65 which generates results in response to data from the instruction register 50 specifier fields, from the calculator arguments and control lines 92, from the microengine 58 and from the calculator arguments 86 generated by the attribute generator 60. Output lines 67 from the calculator 64 are fed to the LCI multiplexers 66 along with the LCI arguments 84 outputs from the attribute generator 60 which together form a 58 bit local computer instruction (LCI) 68 in accordance with control signals received from the microengine 58. The format of the LCI output word comprising 6 fields is shown in FIG. 4.

Still referring to FIG. 1, The input to the executive microengine or attribute generator 60 is controlled by multiplexer 56 and may be an opcode 53 from the instruction register 50 or a next address 80 generated by the attribute generator 60. One of these inputs is fed to a control store 61 memory (4K words by 59 bits) and the output of the control store 61 is stored in a register 62 in the attribute generator 60. The ability of the attribute generator 60 to feed back to its input an AG next address 80 allows sequencing of the attribute generator 60 through a program in its control store memory 61 with the added flexibility of not requiring sequential addressing as would be the case if a microprogram counter were used. Since the opcode values are essentially contiguous and the instructions are of varying lengths, this approach conserves microprogram address locations. The attribute generator 60 provides a control 82 signal to the multiplexer 56 for selecting one of the two input address sources. It also generates a microengine address 76 for microengine 58 along with microengine control signals 78. Another output of the attribute generator 60, the calculator arguments 86, is fed to the calculator 64 and the attribute generator 60 also generates LCI arguments 84 signals fed to LCI multiplexer 66 for determining the local computer instruction 68 in conjunction with information generated by the microengine 58 and calculator 64.

Referring now to FIG. 2, there is shown a block diagram of a pipelined computer system 24 comprising the instruction preparation unit 10. The pipeline for processing information obtained from an instruction memory (IM) 16 comprises the instruction preparation unit (IPU) 10 which is coupled to an operand handler unit (OHU) 12 and the output of OHU 12 is coupled to an execution unit (EU) 14. A parallel address bus 22 and data bus 23 interconnect the instruction memory 16 and operand handler unit 12 to a data memory 18 and I/0 processors 20. If the results of the processing by these processing units are retained in the execution unit 14, then no further processing for the instruction is required. However, if the results of processing are to be stored in memory, the results are delivered back to the OHU 12 which handles a required "write to memory" operation. The IM 16 is a two-ported read-only memory (ROM) which stores a specified program. One port of the IM 16 is connected to the instruction address bus 28 and the instruction data bus 26. The other port is connected to the computer address bus 22 and computer data bus 28. When the IM 16 is read by an instruction preparation unit, the memory delivers 64 bits of information over the instruction data bus 26. When the instruction memory 16 is addressed via the computer address bus 22, the instruction memory 16 delivers 32 bits of data over the computer data bus 23. The data memory (DM) 18 is a single-ported random access memory (RAM) organized as an odd/even interlaced memory wherein odd numbered memory locations are stored in one memory module and even numbered memory locations are stored in a second memory module. When memory is accessed, an odd and an even module responds to make available 4 bytes of memory data aligned to the address least significant bits. Logic at the memories selects the desired contiguous bytes which are to be read from the memory or written into the memory. As described hereinafter the IPU 10 receives variable length instructions 51 and converts them into local computer instructions 68. The operand handler unit (OHU) 12 performs the memory read and write operations required by the IPU 10 and the EU 14. The OHU 12 removes the memory accessing workload from the EU 14 permitting the EU to operate at increased processing speed. In addition, the OHU centralizes the functions required to resolve conflicts due to the differences in pipeline timing between the IPU 10 and the EU 14. The EU 14 performs the logical and arithmetic manipulations required to execute modified LCIs 68 formats received from the OHU 12. The EU 14 is capable of performing the following four types of arithmetic manipulations: binary two's complement, binary one's complement, sign and magnitude and binary coded decimal. The EU 14 has three arithmetic units (AU). The first AU has a double 32-bit wide AU organized as two AUs in parallel. The second AU is a high speed multiplier/divider and the third AU is an exponential arithmetic unit used in floating point calculations.

Referring now to FIG. 3B, an example of the operation of the tightly coupled microengine 58 and attribute generator 60 for an instruction calling for a two operand longword (32 bits) ADD shall be described. The opcode 53 for the longword ADD instruction comprises one byte and has the acronym ADDL2. The addition will be performed on the contents of a register 3 (as defined by specifier 1) and the contents of a memory address generated by the contents of a register 2 (defined by specifier 2 and a displacement specified by the 4 bytes of specifiers 3, 4, 5 and 6 of the instruction shown in FIG. 3B). The instruction preparation unit 10 evaluates the instruction word producing elementary opcode operations such as LOAD, ADD, STORE, etc. and final address values of immediates for data fetching and operation execution.

The output of the IPU 10 as shown in FIG. 4 to the pipeline is referred to as the local computer instruction (LCI) 68; it has fields to handle a 6-bit Operand Handler Unit (OHU) opcode, a 10-bit execution unit (EU) opcode, a 5-bit EU register address and either a 5-bit EU register address, a 32-bit absolute address or a 32-bit immediate. The register addresses or absolute addresses may be either a source or a destination while the immediate may only be a source argument. The LCI 68 word also comprises a trail sequence number (TSN) which identifies computer instructions in the pipeline.

Referring to FIG. 1 in the preferred embodiment the IPU 10 decodes the instruction stored in the instruction register 50 and provides an LCI 68 output to the pipeline in one microcycle after the start of an instruction such as the one shown in FIG. 3B. The IPU 10 decodes the opcode plus the next two operand specifiers as required in one microcycle and generates a specifier evaluated instruction for the pipeline in the next microcycle for further processing by the system. This requires the IPU 10 decoding logic to examine the contents of one to seven bytes of an instruction in one microcycle in order to produce a calculated output in the next microcycle. The two microengines 58 and 60 each operate on a different portion of the instruction at the same time. Each microengine knows where the other one started, what the other one is doing and what output is expected from each microengine. Hence, a decision is made at the start of each instruction as to what portion of the processing load is to be accomplished by each microengine. Since portions of the instruction are interdependent on each other (e.g., specifier evaluation lengths on the opcode), parameters must be requested and passed between microengines 58 and 60 as they progress through their processing sequences to produce the required output. One of the microengines, the attribute generator 60, dispatches tasks and parameters to the main microengine 58 which generates routines to control the IPU 10. The main microengine 58 performs a routine using parameters passed to it from the executive microengine 60 to produce the required LCI 68 output for the processing pipeline. The executive function for the next routine is formed in parallel with the present routine being performed by microengine 58. At the completion of a routine, the microengine 58 signals the executive or attribute generator 60 to obtain the next task command to process along with any parameters associated with that task.

An opcode 53 is examined at the start of an instruction and the entry point into the executive microengine 60 is determined. Since this executive microengine 60 produces attributes for the main microengine 58 which are a function of the instruction, such as data type, data length and index multiplier, it is referred to as the attribute generator 60. The main microengine 58 uses as an entry point, either the opcode 53 or the specifiers 55 which is determined by the opcode 53. If the instruction has no associated specifiers or work is done before the first specifier is evaluated, entry is by opcode; otherwise, it is by specifier(s). On specifier entry, if the instruction has only one specifier or if the results of evaluating two specifiers can not be packed into a single LCI 68, the specifier following the opcode is evaluated. Finally on specifier entry if the evaluation of the first two specifiers can be packed into one LCI 68 the two specifier values will determine the entry point. After initial evaluation of the specifier(s) or opcode, evaluation of specifiers occurs on a single specifier basis as required.

In the selected instruction format, specifiers 55 do not uniquely identify the operation, but rely on the opcode 53 for modifying attributes. An example of this is an ADD word with a register-indirect index specifier. Here, an index modifier, 2, and the length of the data to be operated on are determined by the opcode. The specifier evaluation routines in the microengine 58 can be considered as a set of generic routines for all instructions. This being the case, the attribute generator 60 must supply the required arguments for the microengine 58 and the LCI 68 output as a function of the opcode.

The attributes required by the calculator 64 vary on the basis of both the opcode and the relative specifier position. In addition, the same parameters may require variations during the microengine 58 routines required to complete processing the instruction. The attribute generator produces the following microengine control 78 outputs for use by the microengine 58 for its calculations:

1. Shift code required for index multiplication;
2. Sign extend control for byte and word lengths;
3. Floating point control;
4. Align immediate data control for second longword of a quadword (64 bits).

The attribute generator 60 also produces a memory access type argument for all specifiers for exception detection. For example, a memory write access type argument is required for the second specifier in FIG. 3B and is produced by the attribute generator 60. If the microengine 58 detects an immediate operation in its specifier evaluation (i.e., write to an immediate), an exception routine is entered on the basis of the access type. An additional output is provided denoting the next specifier length when known only by the attribute generator 60. This is the case for instructions such as branch instructions which have no explicit specifiers but are rather followed by a byte displacement. The next specifier length is used to increment the program counter.

When the microengine 58 has completed a generic specifier evaluation, it must determine where to vector to next in the sequence of events. This is analogous to the return linkage at the end of a subroutine. Hence, it becomes evident that a micro-subroutine stack is not required. Another way of interpreting the vector is to consider it as the next operation to process in the sequence of events as commanded by the executive. This command as it comes from the attribute generator 60 may vector the microengine 58 to the following operations:

1. Evaluate a new instruction;
2. Evaluate the next generic instruction specifier in the microengine 58;
3. Evaluate the next instruction specifier in the microengine 58 from an address specified by the attribute generator 60;
4. Vector the microengine 58 to an address specified by the attribute generator 60; and
5. Vector to the next address as specified by the microengine 58.

"Evaluating a new instruction" is used at the end of the present instruction to initiate the process of opcode or specifier entry once again. When follow-on specifier evaluation is required it may be invoked by one of two vectors; they are either a generic specifier evaluation or a special specifier evaluation entry point. The special specifier entry point allows for evaluating follow-on specifiers differently, favoring specific types of specifiers as generated by compilers for certain instructions. This process saves one or more cycles for the most likely specifiers, thus speeding up the instruction evaluation.

When the microengine 58 reaches a decision point in a task, the attribute generator 60 can direct the microengine 58 to either continue processing that task or jump to a different point in the microengine 58 control store 57. This is accomplished using the address specified by the microengine 58 or the address specified by the attribute generator 60 respectively. The address specified by the attribute generator 60 is used after a generic specifier evaluation and may either call for another generic specifier routine or for instruction specific microcode in the microengine 58.

Referring now to FIG. 4, both the microengine 58 and the attribute generator 60 produce outputs for the LCI 68. Fields 1, 2 and 4, as shown in FIG. 4 are generated by both engines with independent selection of the LCI multiplexer 66 for each field under control of the microengine 58. In field 1, the execution unit (EU) 14 opcode may be generated by the microengine 58 in the case of continued processing in the microengine 58 and by the attribute generator 60 in the case of a generic specifier evaluation as a function of the instruction being processed. In field 2 the operand handler unit (OHU) opcode is produced by microengine 58 for continued processing and by the attribute generator for generic specifiers as a function of the length and access mode as demanded by the instruction. Field 3 specifies a trail sequence number which identifies instructions in the pipe and is used to flush the pipe on a wrong way jump. It enables the EU 14 to recognize instruction boundaries. The 2 bits of field 5 specify the interpretation of the 32 bits in field 6. The 5-bit register address of field 4 has four sources under control of the microengine 58. Two of the inputs, specifiers 1 and 2 register numbers, come directly from the instruction stream. The other two inputs are register numbers generated by the two microengines 58 and 60. The microengine 58 generates the number for normal continued microengine processing and the attribute generator 60 does so for cases such as generic specifiers where they are unknown to the microengine 58. The multiplexer 54 controls can be considered as LCI parameter passing controls. With them the microengine can specify using its own parameters or obtain the parameters from the attribute generator 60 for the LCI 68. An AG control 90 signal from the microengine 58 is used to increment the attribute generator 60. Such control signal output to the attribute generator 60 may be considered as a request which calls for new arguments or inputs from the attribute generator 60 as required.

Figures 5, 6:
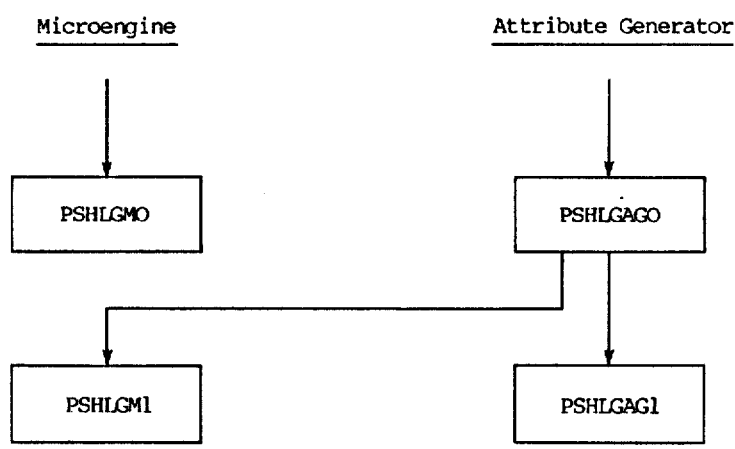
FIG. 5 shows an instruction format for a push longword source operand onto stack (PSHLG) instruction.
FIG. 6 is a microcode flowchart for the PSHLG instruction showing the parallel operation of the microengine and the attribute generator during the instruction execution.

The interpretation of a simple input instruction for example, a "push longword source operand onto the stack" (PSHLG) instruction by the IPU 10 shall be described which illustrates the interaction of the two microengines, main microengine 58 and attribute generator 60. Referring now to FIG. 5, the instruction format of the PSHLG instruction is shown. It contains a single opcode byte (PSHLG) followed by the longword source operand specifier. The source operand may be either one or two bytes depending upon the addressing mode followed by a displacement of one, two or four bytes if displacement addressing mode is specified. The PSHLG instruction operation is such that the final value of the source operand is written to a stack pointer location after the stack pointer is decremented. The instruction is executed with the IPU 10 evaluating the opcode and source specifier and writing the source value to a temporary register in the EU 14. The IPU 10 then directs the EU 14 to decrement the stack pointer and write the source value in the temporary register to the decremented stack pointer. Since the IPU 10 instruction evaluation is pipelined with the previous execution cycle, the instruction takes two cycles to be performed in the IPU 10 for non-indexed operand specifiers. One cycle is devoted to evaluating the opcode and specifier producing the first LCI 68 which writes to an EU 14 temporary register. The second cycle generates the LCI 68 to the EU 14 completing the instruction.

Referring now to FIG. 6, a microcode flow chart of the PSHLG instruction is shown. Initially, the microengine 58 enters the instruction by evaluating the specifier in a generic routine denoted by PSHLGM0. The attribute generator 60 enters the instruction by opcode at routine PSHLGAG0. The microengine 58 evaluates the generic specifier and places the immediate or final memory referenced address in field 6 and the operand type in field 5 of the LCI 68. It also enables the other fields, as required, from the attribute generator 60. For immediate values, the microengine 58 provides the OHU 12 opcode to pass unchanged to the EU 14. For memory references, the attribute generator 60 provides the read longword opcode for the OHU 12 under control of the microengine 58. The attribute generator 60 provides the additional arguments to form the remainder of the LCI

68. It produces the EU 14 opcode of "move to temporary" for field 1, the OHU 14 opcode of "read longword" for field 2 and the EU 14 "temporary register number" for field 4 of the LCI 68. The attribute generator 60 also generates the address vector used by the microengine 58 in the next cycle (PSHLGM1) and the control code to vector the microengine 58 to that address. In the last cycle of the generic specifier evaluation associated with PSHLGM0, the microengine 58 enables the output LCI 68, selects the attribute generator 60 control code and address vector for the next address. It also increments the attribute generator 60 for the next cycle (PSHLGAG1) after use of the aforementioned address vector.

In the next cycle the work of supplying the LCI 68 which decrements the stack pointer and stores the longword on the stack is done exclusively in the microengine 58 at PSHLGM1. The attribute generator 60 at address PSHLGAG1 supplies the output required to increment the trail sequence number, field 3, for the next LCI 68 of the new instruction. Both microengines 58 and 60 also set up their next microaddress for evaluating a new instruction. This example of the PSHLG instruction demonstrates the "tightly coupled" operation of microengines 58 and 60 and their parallel operation, thereby speeding up the instruction execution time.

This concludes the description of the preferred embodiment. However, many modifications and alterations will be obvious to one of ordinary skill in the art without departing from the spirit and scope of the inventive concept. For example the size of the control store 57, 61 in each microengine 58, 60 is directly related to the particular variable length instructions 51 being converted to local computer instructions 68. Therefore, it is intended that the scope of this invention be limited only by the appended claims.

What is claimed is:

1. An instruction preparation unit of a computer system comprising:
   register means for storing a variable length instruction;
   first microengine means coupled to said register means for decoding a first portion of said instruction and decoding a second portion for said instruction having said second portion;
   second microengine means, coupled to said register means and having an input coupled to a first output of said first microengine means and a first output of said second microengine means coupled to an input of said first microengine means, for decoding said first portion of said instruction to generate signals for a local computer instruction;
   calculator means, having inputs coupled to a second output of said first and second microengine means and to outputs of said register means and having a first output coupled to an input of said first microengine means, for performing calculations to generate signals for said local computer instruction; and
   means coupled to a second output signal of said calculator means and a third output of said second microengine means for selecting one or more portions of decoded signals from said third output of said second microengine means and/or one or more portions of said calculator means second output signal in response to control signals generated by said first microengine means to form said local computer instruction.

2. The instruction preparation unit recited in claim 1 wherein:
   said first portion of the instruction comprises an opcode field and for said instruction having said second portion, said second portion comprises at least one specifier field.

3. The instruction preparation unit recited in claim 1 wherein:
   said first microengine and said second microengine being interconnected whereby said first output of said first microengine being coupled to said input of said second microengine and said first output of said second microengine being coupled to said input of said first micorengine, for conditionally controlling and providing said input to each other of said first microengine and second microengine.

4. The instruction preparation unit recited in claim 2 wherein:
   said first microengine means receives an address via a multiplexer means having a plurality of address source inputs including address sources from said register means and said second microengine means.

5. The instruction preparation unit recited in claim 4 wherein:
   said multiplexer means comprises a logic selector for selecting one of said plurality of address sources in accordance with control signals received from said first microengine, said second microengine and said opcode portion of said instruction word.

6. The instruction preparation unit recited in claim 1 wherein:
   said first microengine comprises a control store means; and
   an output from said control store means is stored in a first microengine register means.

7. The instruction preparation unit recited in claim 1 wherein:
   said second microengine comprises a control store means; and
   an output from said control store means is stored in a second microengine register means.

8. An instruction preparation unit of a computer system comprising:
   register means for storing a variable length instruction;
   first microengine means coupled to said register means for decoding a first portion of said instruction and a second portion for said instruction having said second portion;
   second microengine means, coupled to said register means and having an input coupled to a first output of said first microengine means and a first output of said second microengine means coupled to an input of said first microengine means, for decoding said first portion of said instruction to generate signals for a local computer instruction;
   calculator means, having inputs coupled to a second output of said first and second microengine means and to outputs of said register means and having a first output coupled to an input of said first microengine means, for performing calculations to generate signals for said local computer instruction;
   means coupled to a second output signal of said calculator means and a third output of said second microengine means for selecting one or more portions of decoded signals from said third output of said second microengine means and/or one or more portions of said calculator means second output signal in response to control signals generated by said first microengine means to form said local computer instruction; and prefetch control means coupled to said register means output for providing an instruction stream to said instruction storing register means by obtaining a next variable length instruction field while a previously obtained instruction field is being processed.

9. The instruction preparation unit recited in claim 8 wherein:

said first portion of the instruction comprises an opcode field and for said instruction having said second portion, said second portion comprises at least one specifier field.

10. The instruction preparation unit recited in claim 8 wherein:

said first microengine and said second microengine being interconnected whereby said first output of said first microengine being coupled to said input of said second microengine and said first output of said second microengine being coupled to said input of said first microengine, for conditionally controlling and providing said input to each other of said first microengine and second microengine.

11. The instruction preparation unit recited in claim 9 wherein:

said first microengine means receives an address via a multiplexer means having a plurality of address source inputs including address sources from said register means and said second microengine means.

12. The instruction preparation unit recited in claim 11 wherein:

said multiplexer means comprises a logic selector for selecting one of said plurality of address sources in accordance with control signals received from said first microengine, said second microengine and said opcode portion of said instruction word.

13. The instruction preparation unit recited in claim 8 wherein:

said first microengine comprises a control store means; and an output from said control store means is stored in a first microengine register means.

14. The instruction preparation unit recited in claim 8 wherein:

said second microengine comprises a control store means; and an output from said control means is stored in a second microengine register means.

15. A pipeline computer system comprising:

memory means for storing instructions and data;

instruction preparation means coupled to said memory means for converting a variable length instruction into a local computer instruction;

operand handler means coupled to said instruction preparation means for transferring information to and from said memory means and resolving pipeline timing conflicts within said computer system;

execution means coupled to said operand handler means for performing logical and arithmetic operations;

bus means interconnecting said memory means, said operand handler means and said execution means for transferring address and data information to and from each of said memory means, said operand handler means and said execution means;

said instruction preparation means further comprising:

register means for storing said variable length instruction;

first microengine means coupled to said register means for decoding a first portion of said variable length instruction and decoding a second portion for said variable length instruction having said second portion;

second microengine means coupled to said register means and having an input coupled to a first output of said first microengine means and a first output of said second microengine means coupled to an input of said first microengine means for decoding said first portion of said variable length instruction to generate signals for a local computer instruction;

calculator means, having inputs coupled to a second output of said first and second microengine means and to outputs of said register means and having a first output coupled to an input of said first microengine means, for performing calculations to generate signals for said local computer instruction; and means coupled to a second output signal of said calculator means and a third output of said second microengine means for selecting one or more portions of decoded signals from said third output of said second microengine means and/or one or more portions of said calculator means second output signal in response to control signals generated by said first microengine means to form said local computer instruction.

16. The pipeline computer system recited in claim 15 wherein:

said first portion of the variable length instruction stored in said register means of said instruction preparation means comprises an opcode field and for said variable length instruction having said second portion, said second portion comprises at least one specifier field.

17. The pipeline computer system recited in claim 15 wherein:

said first microengine and said second microengine being interconnected whereby said firs output of said first microengine being coupled to said input of said second microengine and said first output of said second microengine being coupled to said input of said first microengine, for conditionally controlling and providing said input to each other of said first microengine and second microengine.

18. The pipeline computer system recited in claim 15 wherein:

said instruction preparation means further comprises a prefetch control means coupled to said variable length instruction storing register means for providing an instruction stream to said instruction preparation means by obtaining a next variable length instruction field from said memory means while a previously obtained instruction field is being processed.

19. The pipeline computer system recited in claim 15 wherein:

said first microengine of said instruction preparation means comprises a control store means; and an output from said control store means is stored in a first microengine register means.

20. The pipeline computer system recited in claim 15 wherein:

said second microengine of said instruction preparation means comprises a control store means; and
an output from said control store means is stored in a second microengine register means.

21. A method of converting a variable length instruction into a local computer instruction with an instruction preparation unit comprising the steps of:
   storing said variable length instruction in a register means of said instruction preparation unit;
   decoding a first portion of said variable length instruction and a second portion of said variable length instruction, for a variable length instruction having said second portion, with a first microengine means coupled to said register means;
   decoding said first portion of said variable length instruction with a second microengine means, said second microengine means being coupled to said register means and having an input coupled to a first output of said first microengine means and a first output of said second microengine means coupled to an input of said first microengine means to generate signals for said local computer instruction; and
   performing calculations to generate signals for said local computer instruction with a calculator means having inputs coupled to a second output of said first and second microengine means and to outputs of said register means and having a first output coupled to an input of said first microengine means; and
   selecting one or more portions of decoded signals from a third output of said second microengine means and/or one or more portions of said calculator means second output signal in response to control signals generated by said first microengine means to form said local computer instruction.

22. The method recited in claim 21 wherein:
said step of decoding said first portion of said variable length instruction comprises decoding an opcode field, and decoding said second portion of said variable length instruction having said second portion comprises decoding at least one specifier field.

23. A method of converting a variable length instruction into a local computer instruction with an instruction preparation unit comprising the steps of:
   storing said variable length instruction in a register means of said instruction preparation unit;
   decoding a first portion of said variable length instruction and a second portion of said variable length instructions, for a variable length instruction having said second portion, with a first microengine means coupled to said register means;
   decoding said first portion of said variable length instruction with a second microengine means, said second microengine means being coupled to said register means and having an input coupled to a first output of said first microengine means and a first output of said second microengine means coupled to an input of said first microengine means to generate signals for said local computer instruction;
   performing calculations to generate signals for said local computer instruction with a calculator means having inputs coupled to a second output of said first and second microengine means and to outputs of said register means and having a first output coupled to an input of said first microengine means;
   selecting one or more portions of decoded signals from a third output of said second microengine means and/or one or more portions of said calculator means second output signal in response to control signals generated by said first microengine means to form said local computer instruction; and
   providing an instruction stream to said instruction storing register means with prefetch control means coupled to said register means for obtaining a next variable length instruction field while a previously fetched instruction field is being processed.

24. The method recited in claim 23 wherein:
said step of decoding said first portion of said variable length instruction comprises decoding an opcode field, and for said variable length instruction having said second portion comprises decoding at least one specifier field.

* * * * *